US012608273B2

(12) United States Patent
Sforzin et al.

(10) Patent No.: US 12,608,273 B2
(45) Date of Patent: Apr. 21, 2026

(54) RAS TRIGGERS L2P TABLE MOVEMENT IN CXL DEVICES WITH COMPRESSION

(71) Applicant: Micron Technology, Inc., Boise, ID (US)

(72) Inventors: Marco Sforzin, Cernusco sul Naviglio (IT); Emanuele Confalonieri, Segrate (IT); Daniele Balluchi, Milan (IT); Danilo Caraccio, Milan (IT); Nicola Del Gatto, Cassina de' Pecchi (IT); Rishabh Dubey, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 17 days.

(21) Appl. No.: 18/778,665

(22) Filed: Jul. 19, 2024

(65) Prior Publication Data

US 2025/0094278 A1 Mar. 20, 2025

Related U.S. Application Data

(60) Provisional application No. 63/517,333, filed on Aug. 2, 2023.

(51) Int. Cl.
    *G06F 11/10* (2006.01)
(52) U.S. Cl.
    CPC ...... *G06F 11/1016* (2013.01); *G06F 11/1068* (2013.01)

(58) Field of Classification Search
    CPC ............. G06F 11/1016; G06F 11/1068; G06F 11/0727; G06F 11/0793; G06F 12/0646
    USPC ......................................................... 714/764
    See application file for complete search history.

(56) References Cited

U.S. PATENT DOCUMENTS

| | | | | |
|---|---|---|---|---|
| 10,445,299 B2 * | 10/2019 | Jain | ....................... | G06F 16/176 |
| 10,838,854 B2 * | 11/2020 | Cho | ....................... | G06F 3/0608 |
| 2021/0056044 A1 * | 2/2021 | Grosz | ................. | G06F 12/1408 |
| 2022/0114048 A1 * | 4/2022 | Hsieh | .................... | G06F 3/0661 |
| 2022/0342553 A1 * | 10/2022 | Gyllenskog | ............. | G06F 3/064 |
| 2024/0054971 A1 * | 2/2024 | Cariello | ............... | G11C 16/102 |

FOREIGN PATENT DOCUMENTS

| | | | | |
|---|---|---|---|---|
| CN | 114093406 A | * | 2/2022 | ............. G11C 16/24 |

* cited by examiner

*Primary Examiner* — Albert Decady
*Assistant Examiner* — Enam Ahmed
(74) *Attorney, Agent, or Firm* — Wood IP, LLC; Theodore A. Wood

(57) ABSTRACT

Provided in a central controller system, is a system and method to identify and mitigate errors on a die containing mission critical logical-to-physical addressing information. The logical-to-physical (L2P) addressing information is essential for translating logical memory addresses for uncompressed data to physical addresses for compressed data. When a die containing L2P data is detected as being corrupted, the corrupted data is corrected, and all the data is moved to an uncorrupted die at a specified offset from the original address of the die.

18 Claims, 6 Drawing Sheets

Legacy Host CPU With Main Memory 105 (Motherboard)

Host CPU 107

ASICs 106

110
DDR Controller and Physical Layer

102(R/W)
Data Read/Write
Commands

120
DRAM Channel

Dynamic Random Access Memory
(DRAM)

115

100

305

Dynamic Random Access 115
Memory (DRAM)

| Logical | Physical |
|---------|----------|
| L1 | P1 |
| L2 | P2 |
| L3 | P3 |
| L4 | P4 |
| L5 | P5 |
| L6 | P6 |

Logical to Physical Table 220

L2P Location Equation

RAS TRIGGERS L2P TABLE MOVEMENT IN CXL DEVICES WITH COMPRESSION

CROSS-REFERENCE TO RELATED APPLICATION

This application claims benefit to U.S. Provisional Patent Application No. 63/517,333, filed Aug. 2, 2023, the disclosure of which are incorporated herein in their entireties, by reference.

FIELD OF TECHNOLOGY

The following relates generally to one or more systems for memory. In particular, it relates to error detection, correction, and preserving critical logical-to-physical (L2P) addressing stored on dynamic random access memory (DRAM).

BACKGROUND

Memory devices (also referred to as memory media devices) are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logical 1 or a logical 0. To access information stored by a memory device, a component may read, or sense, the state of one or more memory cells within the memory device. To store information, a component may write, or program, one or more memory cells within the memory device to corresponding states.

Over time, memory cells may degrade, resulting in data corruption when data is read to memory or read back from memory. To compensate for this degradation, memory such as DRAM may have reserved memory locations. These reserved memory locations may be deliberately not utilized when the DRAM is fresh from the factory, when the DRAM is originally packaged. Instead, these memory cells are reserved for what is called post-package repair. This means over the lifetime of a DRAM, the reserved memory cells may be substituted for original memory cells when the original memory cells show signs of failure over time.

Application specific integrated circuits (ASICs) may be designed and used for many different purposes in computers, mobile phones, and other digital systems and control systems. For example, an ASIC may regulate access to DRAM by a computer's central processing unit (CPU) or by a cell phone's microprocessor. As a further example, a computer express link (CXL) ASIC may function as a controller to both regulate dynamic memory and to integrate different digital memory circuits according to recently emerging hardware standards.

Data from the host system may also be compressed when stored in memory. When data is compressed, logical memory addresses provided by the host system are translated to different physical memory addresses. The address mapping of logical addresses to physical addresses may be stored in a L2P table which is itself stored in DRAM. If the die on which the L2P table is stored becomes damaged or corrupted, the correct memory mappings may still be recovered through various error correction methods. However, it is preferable to store an uncorrupted version of the L2P table, which may entail moving the corrected mapping data to a new die.

BRIEF DESCRIPTION OF THE DRAWINGS

Advantageous designs of embodiment of the present disclosure result from independent and dependent claims, the description, and the drawing. In the following, preferred examples of embodiments of the disclosure are explained in detail with the aid of the attached drawings. The drawings, which are incorporated herein and form part of the specification, illustrate the present disclosure. Together with the description the drawings further serve to explain the principles of the disclosure, and to enable a person skilled in the relevant art(s) to make use of the disclosure.

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
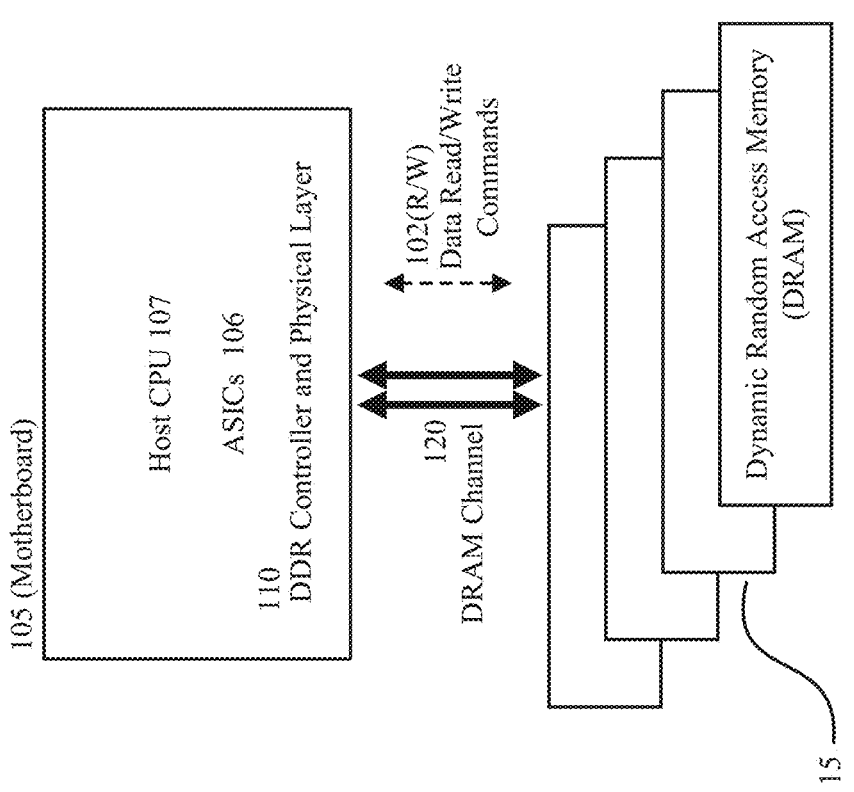
FIG. 1 illustrates a diagrammatic modular depiction of an exemplary legacy host computer system.

FIG. 1 illustrates a diagrammatic modular depiction of an exemplary legacy host computer system 100. The computer system 100 includes an exemplary motherboard 105 including a host CPU 107 and various ASICs 106 known in the arts. The motherboard 105 may also include various data buses (including DRAM channel 120), physical ports, and expansion slots (not shown).

For example, the motherboard 105 may include slots for insertion and communicative coupling of the DRAM 115 shown elsewhere in FIG. 1. Among the ASICs on the motherboard 105 may be a double data rate (DDR) controller and physical layer 110. The DDR controller and physical layer 110 provide for direct data communications between the host CPU 107, and for direct read/write (R/W) commands 102 of the DRAM 115 by the host CPU 107. The direct data communications and the R/W commands 102 may occur via the DRAM channel 120.

Figure 2:
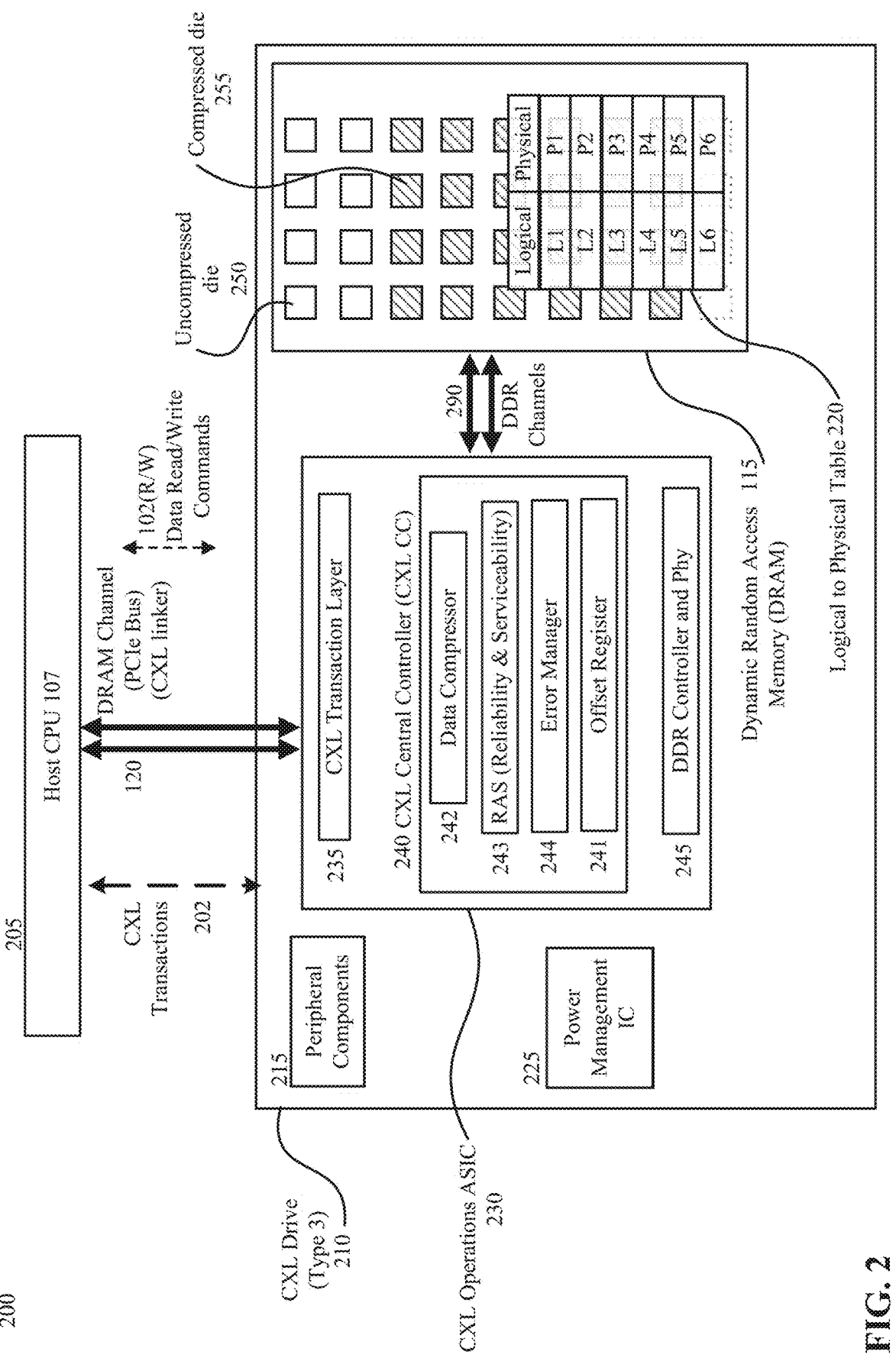
FIG. 2 illustrates a diagrammatic modular depiction of an exemplary host computer system which includes CXL technology.

FIG. 2 illustrates a diagrammatic modular depiction of an exemplary host computer system 200 which includes CXL technology. By way of background, CXL is an open standard, cache-coherent interconnect for processors, memory, and memory expansion. CXL is defined by a series of commands and required memory command responses defined in a specification created by the Joint Electron Device Engineering Council (JEDEC) Solid State Technology Association and the CXL Consortium.

CXL technology maintains memory coherency between memory space of a host CPU 107 and DRAM 115 on attached devices. The motherboard 105 and CPU 107 in combination may be referred to in the art as simply the host device and may have memory in addition to the CXL ASIC. A host device 205 is a source of data write commands (W) and data read requests (R), which comprise the CXL transactions 202.

A service mastering bus (SMBus) not shown in the figure may communicate control commands and CXL ASIC status to/from the host CPU 107 from/to the CXL drive 210. The CXL drive 210 may be composed of multiple ASICs mounted to a shared board or may be a single ASIC with multiple sub-modules. In general, the CXL drive 210 reads and writes data from/to DRAM memory 115, or other kinds of suitable data storage, responsive to data requests from the host CPU 107.

The host device 205 may include an exemplary motherboard and various ASICs known in the art. The motherboard 105 may again include various data buses, including DRAM channel 120. The DRAM channel 120 may be a Peripheral Connect Interface express bus (PCIe Bus), which may also be referred to as the CXL linker. The host device 205 may also have physical ports and expansion slots (not shown).

The motherboard 105 may have mounted onboard or include slots (not shown) for the insertion of the CXL drive 210. As discussed throughout this document, the CXL drive 210 serves as a mediator and controller between the CPU 107 and the DRAM 115. The DRAM channel 120 is used to digitally ferry CXL transaction commands 202 between the host CPU 107 and the CXL drive 210. The motherboard 105 may also include slots (not shown) for insertion and communicative coupling of the DRAM 115 shown elsewhere in the figure. In turn, the CXL drive 210 and the DRAM 115 are typically coupled via DDR channels 290, which may themselves be integrated into the motherboard 105.

The CXL drive 210 may itself include an exemplary CXL Operations ASIC 230. The CXL Operations ASIC 230 may itself include a CXL transaction layer 235 configured to provide data interfacing for CXL transactions 202, and thereby for data R/W commands 102, to/from the host CPU 107. Unlike conventional main memory, where the CPU 107 makes transactions to DRAM 115 through the DRAM channel 120, a CXL drive 210 may have one or more ASICs to intercept CXL transactions 202, made through the CXL drive 210, and convert them to DRAM transactions. One function of the CXL operations ASIC 230 in a CXL drive 210 is to convert R/W commands 102, made through the CXL transactions 202, to DRAM requests.

The CXL operations ASIC 230 may also include a CXL central controller (CXL CC) 240 and a DDR controller and physical layer 245. The motherboard 105 may be directly connected to CXL operations ASIC 230 via DRAM channel 120. The DDR controller and physical layer 245 may operate similarly to the DDR controller and physical layer 245 of computer system 100 interfacing with the DRAM 115, as discussed above. Similarly, the CXL Operations ASIC 230 may be directly connected to DRAM 115 via DDR channels 290. Specifically, the CXL CC 240 is communicatively coupled to the DRAM 115.

The CXL Operations ASIC 230 may have logic blocks (shown as CXL CC 240) to perform additional tasks such as error correction, thermal management, media management, etc. In particular, the CXL CC 240 may include a data compressor module 242, a reliability and serviceability module (RAS) 243, and an error manager 244. In some embodiments, the CXL CC may also include an offset register 241 (which may be part of the error manager 244) and may be used to store a memory address offset 420 (see FIG. 4). In an alternative embodiment, there may be no offset register 241, and the memory address offset 420 may be stored in a suitable memory location in an uncompressed die 250 or in a compressed die 255. The operations of the CXL CC 240 are further discussed below.

The CXL drive 210 may additionally include a variety of peripheral components 215 the details of which are beyond the scope of this document and a power management integrated circuit (IC) 225.

In embodiments, the CXL drive 210 has on-board DRAM 115 which has multiple die 250, 255 for data storage. Some die may be designated for use as uncompressed die 250 which store uncompressed data while others may be designated for use as compressed die 255 which store data that has been compressed by data compressor module 242. Restated, there is an uncompressed section of memory die 250 and a compressed section of memory die 250. The die 250, 255 may also be used to store a logical-to-physical table 220 which maps logical addresses Ln provided by the CPU 107 and/or DDR controller and physical layer 245 to physical memory addresses Pn on the compressed die 255.

Figure 3:
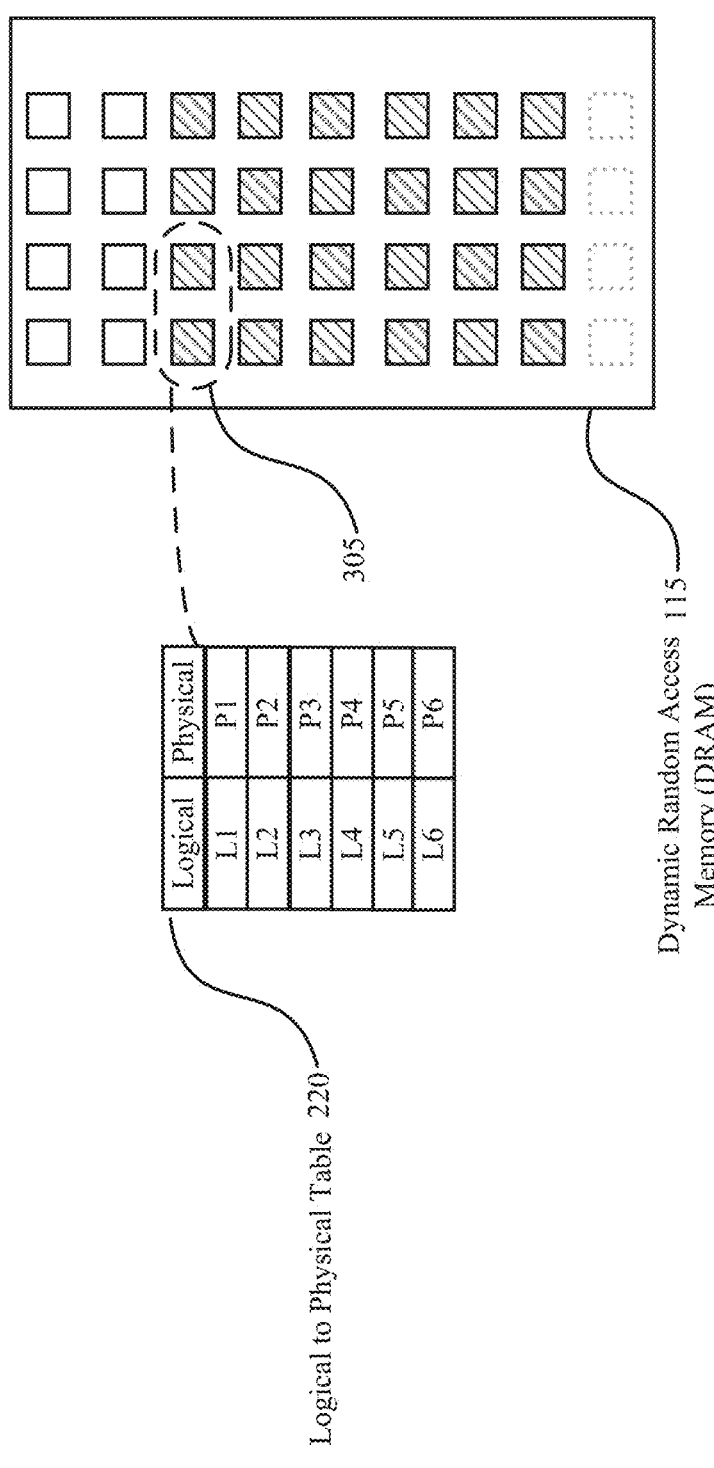
FIG. 3 illustrates a diagrammatic modular depiction of a Logical-to-physical memory table.

FIG. 3 presents another schematic view of the DRAM 115 and L2P table 220. As indicated in the figure, one, two, or more selected dies 305, which may be referred to as L2P dies 305, may initially be designated to store the L2P table 220.

CXL with the compression feature is used to increase the capacity of the CXL device. A data compressor module 242 may use any of a variety of lossless compression schemes, for example LZ4, to compress data received from the DRAM channel 120. This results in greater effective storage capacity in the DRAM 115.

Because data compression is employed selectively (that is, not with all data), DRAM 115 is typically mapped into two regions, one designated as uncompressed dies 250 and one with compressed dies 255. (It will be noted that the dies are typically physically the same dies but are designated for the different types of storage.) These two different regions are visible to the CXL operations ASIC 230 but not to the host CPU 107. As a result of the data compressor module 242, the CXL drive 210 can store data in a smaller physical area (using less DRAM 115) as compared to the amount of data received from the host CPU 107.

The L2P table 220 provides a linear page mapping from data as requested by the host CPU 107 and data as stored in the DRAM 115. There is a page mapping, mapping logical addresses Ln to physical addresses Pn. The L2P table 220 is implemented in the media subsystem, that is, it is stored in the DRAM 115, so that some dies 305 of the DRAM is occupied by the L2P table 220.

The L2P table 220 can be contained in one or even more L2P dies 305. As with any DRAM, a die can have a failure in a CXL drive 210.

The CXL operations ASIC 230 features a RAS 243, which provides error detection and can correct data with errors. For example, Chipkill™ may be employed for error detection and correction. Chipkill has RAS features that can correct the errored data on a chip data. If an entire die is broken, Chipkill is one exemplary mechanism to correct an error coming from an entire die failure.

Thus, the RAS 243 decode module (not illustrated) provides for 64 bytes of cleaned and corrected data even from a chip with an error. The CXL drive 210 can then collect the target data from the appropriate location in compressed physical memory. The RAS 243 can correct up to one die, based on redundancy in the stored data. Another exemplary error correction mechanism is Reed-Solomon code. Chipkill, Reed-Solomon, and other error-correcting codes are consistent with the present system and method.

If an error occurs in the L2P table 220, it can be corrected each time the error is detected via the error-correcting methods described above. However, this requires the consumption of both clock cycles and energy, both of which are preferably minimized. Further, if additional errors occur on the same L2P dies (305), then beyond a certain point they are not correctable. As a result, the entire L2P table 220 is permanently corrupted and the CXL drive 210 is then rendered useless.

In an embodiment, the present system and method first identifies the corrected mapping data for the L2P table 220. But additionally, when a failure impacts the L2P table, this triggers a movement, that is, a copy, of the entire contents of the L2P die(s) (305) to another area of the compressed dies 255.

Restated: Chipkill, Reed-Solomon, and other error-correcting methods can work to correct errors in the L2P table 220. But the L2P table 220 should be preserved for the entire life of the system, so it is preferable to not have errors in the L2P table 220 at all. If the L2P table 220 has failed, it is preferable to correct the errors and then move the corrected table to a new location with new L2P dies 305 that are not failed. Therefore, when a failure impacts the L2P table 220 the present system and method triggers a table movement. In one embodiment, the entire table is copied to new dies. In an alternative embodiment, only the part of the table on the failed die is copied to a new location.

Figure 4:
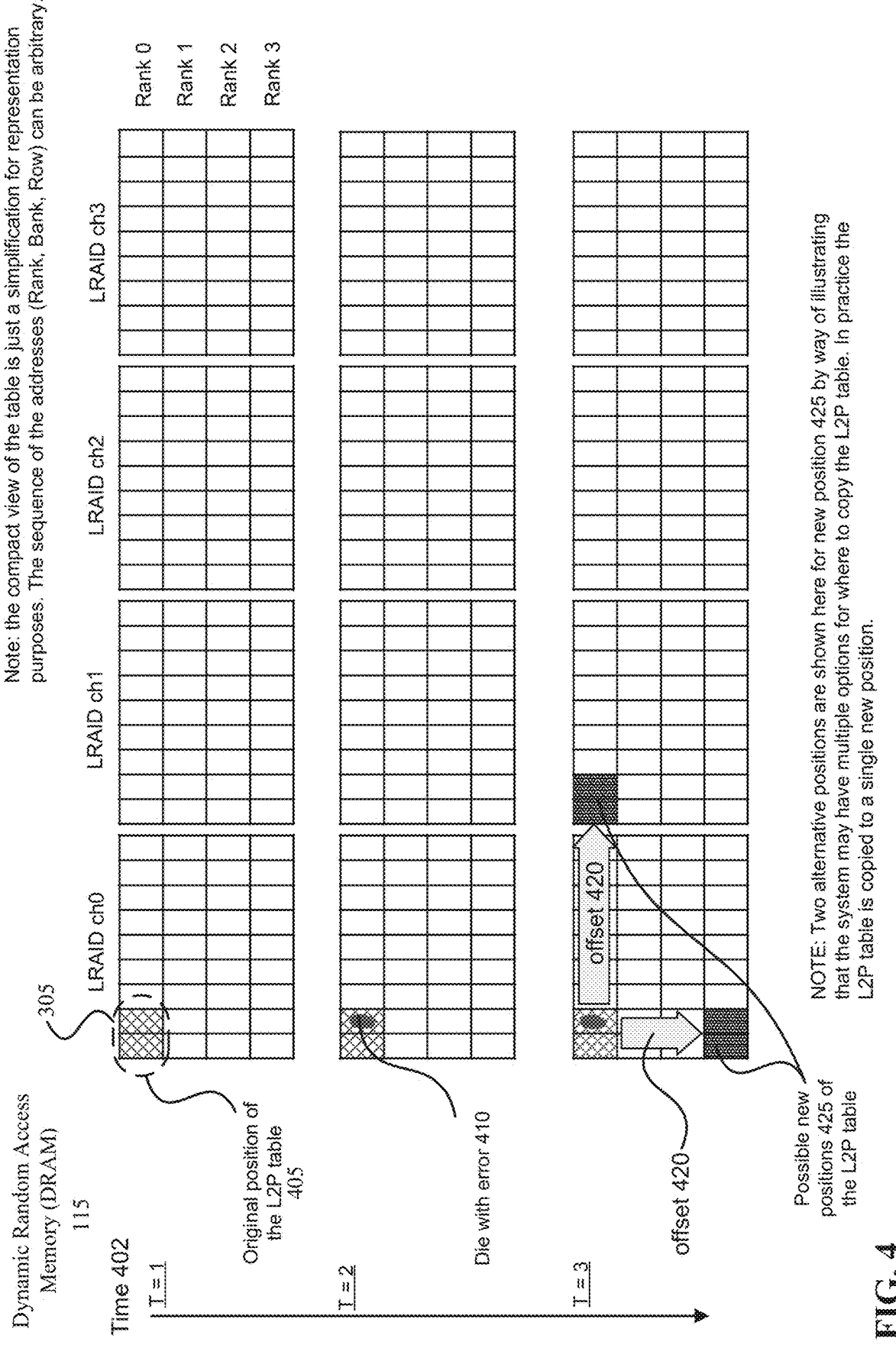
FIG. 4 presents an exemplary time sequence of memory events in exemplary DRAM.

FIG. 4 presents an exemplary time sequence 402 of memory events in exemplary DRAM 115. In FIG. 4, two DRAM die 255 are used to store the L2P table 117, but this is exemplary only. In alternative embodiments only one die may be used or more than two dies may be used.

At a first time T1, the L2P table 117 (see FIG. 5) is stored in two L2P die 305 at specific original position (memory location 405) in the DRAM 115. The original position means the selected die 305 is the initial die used to store the L2P table 117. The selection which may be based on factory settings, settings established during an initial boot-up of the CXL drive 210, or settings established during an initialization of the host device 205, etc.

Throughout time interval from T=1 to up until time T=2, the L2P table 117 in L2P dies 305 is used during normal computer operations. When data is accessed (written to or read from) in compressed memory, the L2P table 117 is used to map physical memory addresses indicated by the host CPU 107 to logical memory addresses. During normal operations, the RAS 243 monitors memory accesses to the L2P die 305 to check for any read errors.

Routine processing operations entail the CXL CC 240 (via the DDR controller and physical layer 245) reading data values from the L2P table 117 and writing data values to the L2P table 117. The data values written to/read from the L2P table 117 may be, for example, a logical address, a physical address, or a paired logical/physical address combined in a single data structure (such as a series of bytes).

At time T=2 a read is performed on the L2P table 117, and the RAS 243 detects a read error in an errored die 410 which is one of the L2P dies 305. The RAS 243 initiates two actions: using suitable error correction methods as discussed above, the RAS 243 is able to correct the read error. The RAS 243 also triggers the error manager 244 to initiates a data copy process.

In one embodiment, the data copy process may copy the entire L2P table 117 to other dies at a new position (memory location 425). The new position is identified in part by a memory address offset 420 indicating the translation from the original memory location 405 to the new position 425. In an alternative embodiment, the data copy process may copy only the data contents of the errored die 410 to a new memory location 425, again identified via a suitable offset 420.

At time T=3, the error manager 244 has completely copied the L2P table 117 to the new memory location 425. All further memory access to the L2P table 117 is made to the dies at new memory location 425.

Figure 5:
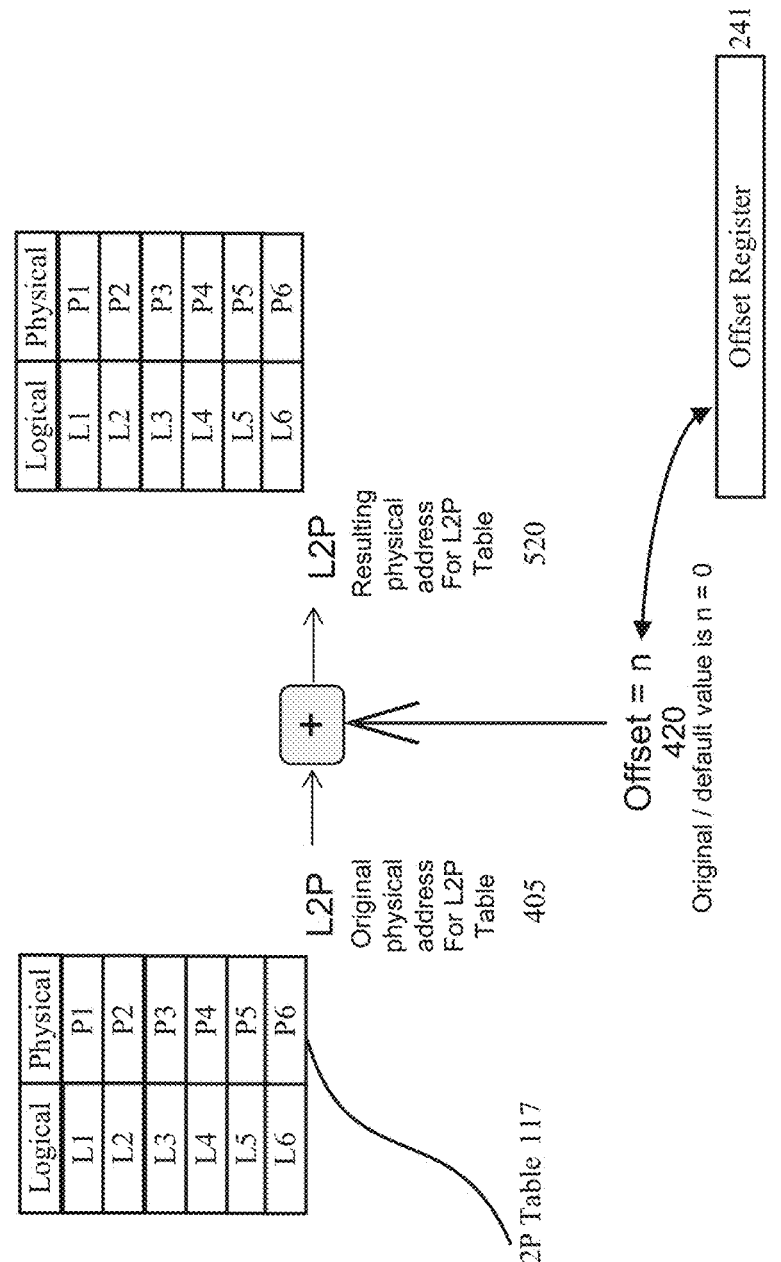
FIG. 5 illustrates an exemplary memory addressing scheme including a location equation for a Logical-to-physical Memory table.

FIG. 5 illustrates an exemplary addressing scheme, employing an L2P location equation 500, via which the CXL CC 240 (including the data compressor module 242 and the RAS 243) can address the L2P table 117. The CXL CC 240 stores the original memory location 405 of the L2P table 117 and stores the offset 420, assigned the value (n) in the figure. By default (for example, during the time interval from T=1 to T=2), n=0. To access the L2P table, the CXL CC 240 adds the original memory location 405 and the offset 420 to obtain a resulting physical address 520.

In some embodiments, the offset 420 is recorded in the compressed region. In an alternative embodiment the offset 420 may be stored in the offset register 241. In some embodiments, the address of the L2P table 117 is stored as a logical address that is translated to a physical location. The offset 420 is added to obtain the actual physical location: L+translate+offset=new physical address As a result, the address of the L2P table 117 is simple to compute, and because the newly placed table incorporates the corrected L2P mapping data, no nanoseconds are lost with data correction.

Figure 6:
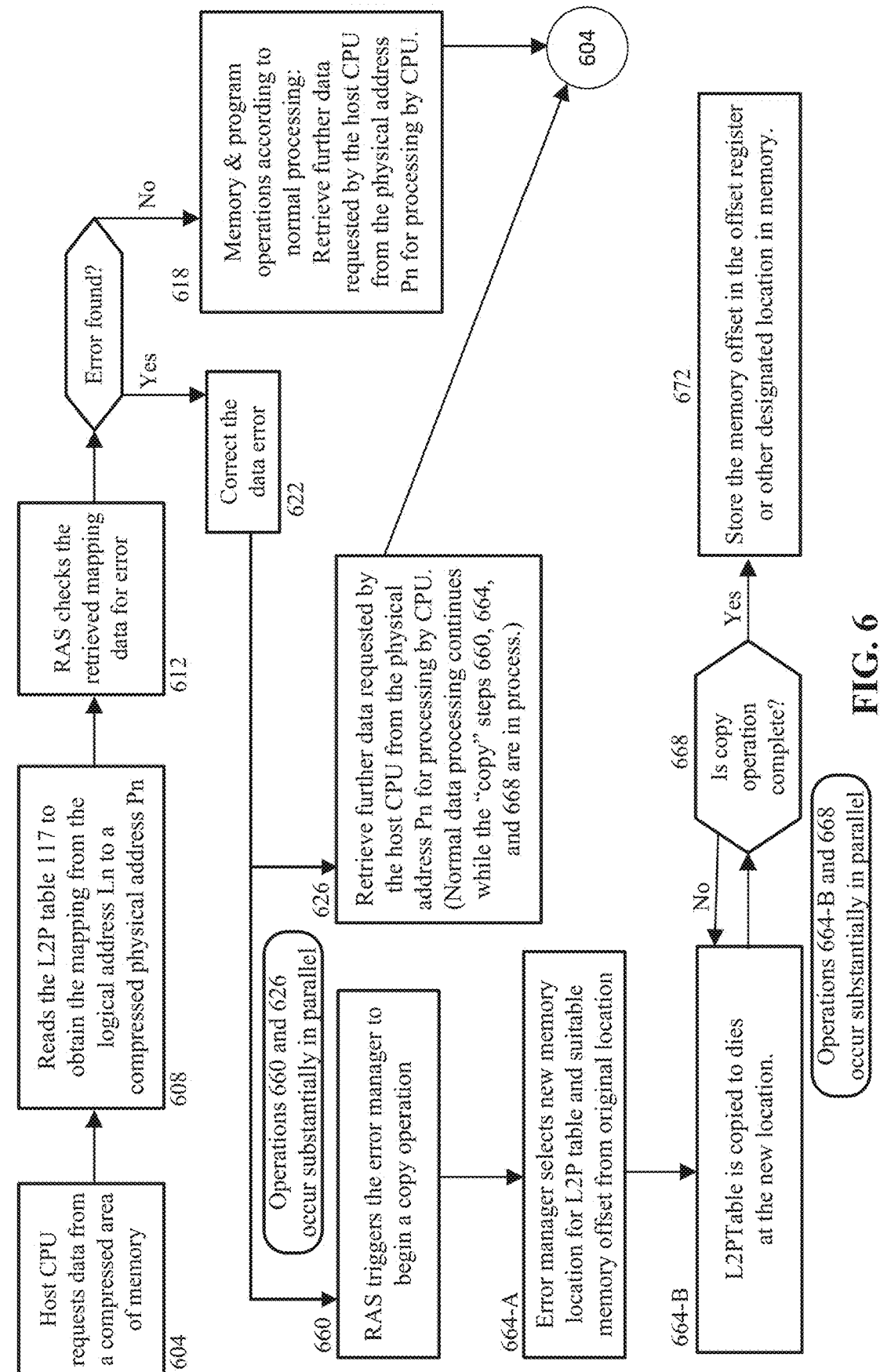
FIG. 6 illustrates a flowchart of an exemplary method to implement copying of a Logical-to-physical memory table to a new location.

FIG. 6 presents a flowchart of an exemplary method 600 for L2P table movement in CXL devices that employ data compression. The method 600 assumes that an L2P table 117 has already been established in the CXL drive at an initial memory location 405 on initial dies 305. The method 600 also assumes that an initial offset 420 has been previously stored in the memory with a value of zero.

The method 600 begins with block 604 where the host CPU requests data from a compressed area of memory, providing a logical memory address Ln. In block 608 the CXL CC 240, and in some embodiments in particular the data compressor module 242, reads the L2P table 117 to obtain the mapping from the logical address Ln to a compressed physical address Pn.

In block 612 the RAS 243 checks the retrieved data for an error. If in block 612 no error is found, the method 600 proceeds with block 618 where program operations proceed according to normal, standard processing. This entails retrieving the data requested by the host CPU 107 from the appropriate physical address in memory Pn. The method 600 returns to block 604.

If in block 612 an error is found, the method 600 proceeds to block 622. In block 622, either the RAS 243 and/or the error manager 244 corrects the error. The method 600 continues with two blocks that may occur substantially in parallel: blocks 626 and 660.

In block 626, memory and program operations proceed according to normal, standard processing. This processing entails retrieving the data requested by the host CPU 107 from the appropriate physical address in memory Pn, according to the corrected L2P memory data as determined in block 626. In block 660, the RAS triggers the error manager 244 to begin a copy operation and the method 600 proceeds with block 664.

Block 664 is the copy operation and contains two sub-blocks: 664A and 664B. In block 664A, a new memory location 425 for the L2P table 117 is determined by the error manager 244. The new memory location 425 is selected from among the unused compressed die 255. The new memory location is identified by an offset 420 from the original memory location 405 of the L2P table 117.

In block 664B, the L2P table 117, with the corrected data, is copied to dies at the new memory location 425. This establishes an uncorrupted L2P table 117.

The data movement during the copy operation is a progressive copy in the background from the original memory location 405 to the new memory location 425. While the data is being copied, the CXL CC 240 will continue to utilize data L2P table 117 at the original location 405, using error correction by the RAS 243.

In block 668, an ongoing or periodic assessment is made of whether or not the copy operation is complete. If the operation is not complete, the copy operation of block 664B continues. If the copy operation of block 664B is complete, the method 600 continues with block 672.

In block 672, the memory address offset 420 is stored in the offset register 241 or other designated location in memory. As a result, once the L2P table 117 is fully copied, any further data access to the L2P table 117 occur at the new memory location 425, in accordance with the L2P location equation 500 (FIG. 5 above).

In an alternative embodiment, the CXL CC 240 knows what mapping data has been moved and what has not been moved and accesses in the appropriate position.

The exposition above in this document assumes that the L2P table 117 fails once, when stored in an original memory location 405 and is then copied (and so, effectively, is moved) to a new memory location 425. However, it will be noted that the new L2P dies 305 at new memory location 425 could also potentially fail at some point. In that case, the methods for copying the L2P table 117 from a first position to second position would be repeated, only not copying from the original L2P table position (memory location 405) but from a current L2P table position (that is, from a current new memory location 425). It will be understood, as phrased in the appended claims, that the current system and method copies the L2P table from a current L2P table position to a new L2P table position.

The present system and method may be employed with numerous different memory chip designs, numerous bus designs, numerous addressing systems and varied memory location schemas, both logical and hardwired/physical.

In particular, the present system and method addresses the problem that physical memory locations can fail or degrade over time. In some embodiments of the present system and method, a semiconductor memory system may reside on a single circuit card or even a single ASIC and may be referred to synonymously in brief as a memory bank.

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description, rather than of limitation.

Those skilled in the art will also appreciate that various adaptations and modifications of the preferred and alternative embodiments described above can be configured without departing from the scope of the disclosure. Therefore, it is to be understood that within the scope of the appended claims, the disclosure may be practiced other than as specifically described herein.

For example, various aspects of the present disclosure can be implemented by software, firmware, hardware (including hardware represented by software such as Verilog or hardware description language instructions), or a combination thereof. After reading this description, it will become apparent to a person skilled in the relevant art how to implement the disclosure using other computer systems and/or computer architectures.

It should be noted the simulation, synthesis and/or manufacture of the various embodiments of this disclosure can be accomplished, in part, through the use of computer readable code, including general programming languages (such as C or C++), hardware description languages (HDL) including Verilog HDL, VHDL, Altera HDL (AHDL), or other available programming and/or schematic capture tools (such as circuit capture tools).

This computer readable code may be disposed within or imposed upon any known tangible computer usable/readable storage medium including semiconductor, magnetic disk, optical disk (such as CD-read only memory ROM, DVD-ROM, or the like); and as a computer data signal embodied in a computer usable (e.g., readable) transmission medium (such as a tangible medium including digital, optical, or analog-based medium). As such, the code can be transmitted over communication networks including the Internet and intranets, from one tangible computer readable medium to another. It is understood the functions accomplished, and/or structure provided by the systems and techniques described above, may be represented in a core (such as a graphics processing unit core) that is embodied in program code and may be transformed into hardware as part of the production of integrated circuits.

It is to be appreciated that the Detailed Description section, and not the Abstract section, is intended to be used to interpret the claims. The Abstract section may set forth one or more but not all exemplary embodiments of the present disclosure as contemplated by the inventor(s), and thus, is not intended to limit the present disclosure and appended claims in any way.

What is claimed is:

1. A tangible, non-transitory, computer readable storage medium comprising instructions that, when executed by a processor of a memory system, cause the processor to execute a method comprising:

reading from a logical-to-physical (L2P) table a data value, wherein the L2P table comprises a mapping of logical addresses to physical addresses in a compressed section of the memory system;

detecting an error in the read operation, the error indicative of a failure of a memory die used to store the L2P table by a reliability, availability, and serviceability (RAS) module;

determining a correction for the error when the error is detected;

copying the L2P table from a current L2P table position to a new L2P table position by an error manager, the new L2P table position being on a different one of the plurality of compressed-data memory die;

wherein determining an address of the L2P table for subsequent accesses comprises adding an offset to an original L2P table address;

wherein the offset is initialized to zero and, responsive to completion of the copying, is updated to reference the new L2P table position;

wherein the copying is performed in background while servicing host I/O, and subsequent reads of the L2P table use the original address plus the offset.

2. The computer readable storage medium of claim 1, further comprising determining the address of the L2P table by addition of a current physical memory address with an offset memory address.

3. The computer readable storage medium of claim 1, further comprising setting an initial value of the offset memory address to zero.

4. The computer readable storage medium of claim 1, further comprising determining if the operation of copying the L2P table from the current L2P table position to the new L2P table position is complete.

5. The computer readable storage medium of claim 4, further comprising setting the offset to a value such that the current L2P table position plus the offset are indicative of the new L2P table position in the memory when the copy operation is complete.

6. A memory system comprising:

a central controller;

a dynamic random access memory (DRAM) communicatively coupled to the central controller, and comprising a plurality of die configured to store compressed data;

a logical-to-physical (L2P) table which is stored in the plurality of die and comprises a mapping of logical addresses to physical addresses in a compressed section of the memory system;

wherein the controller comprises a reliability, availability, and serviceability (RAS) module and an error manager;

wherein the controller further comprises an offset register to store an offset value for locating the L2P table;

wherein the controller is configured to:

read from the L2P table a data value;

detect an error in the read operation, said error indicative of a failure of a memory die used to store the L2P table by the RAS module;

determine a correction for the error when the error is detected;

copy the L2P table from a current L2P table position to a new L2P table position on a different one of the plurality of compressed-data memory die under control of the error manager;

perform the copying in background while continuing to service host I/O;

set the offset register to zero prior to copying and, responsive to completion of the copying, update the offset register to reference the new L2P table position;

and thereafter determine an address of the L2P table by adding the offset value to an original L2P table address.

7. The memory system of claim 6, wherein the central controller is further configured to determine the address of the L2P table by adding a current physical memory address and an offset memory address.

8. The memory system of claim 6, wherein the central controller is further configured to set an initial value of the offset memory address to 0 (zero).

9. The memory system of claim 6, wherein the central controller is further configured to determine if the operation of copying the L2P table from the current L2P table position to the new L2P table position is complete.

10. The memory system of claim 9, wherein the central controller is further configured to set the offset to a value such that the current memory address plus the offset are indicative of the new L2P table position in memory when the copy operation is complete.

11. The memory system of claim 6, wherein the central controller comprises a reliability and serviceability manager configured to trigger the copying of the L2P table upon detecting the error in the read operation.

12. The memory system of claim 6, wherein the central controller comprises an error manager configured to copy the L2P table.

13. The memory system of claim 12, wherein the error manager is further configured to see the offset to the value such that the current memory address plus the offset are indicative of the new L2P table position in memory when the copy operation is complete.

14. A method of copying a logical-to-physical table (L2P) to a new L2P table position, the method comprising:

reading from an L2P table a data value, wherein the L2P table comprises a mapping of logical addresses to physical addresses in a compressed section of the memory system;

detecting an error in the read operation, the error indicative of a failure of a memory die used to store the L2P table; by a reliability, availability, and serviceability (RAS) module;

determining a correction for the error when the error is detected;

copying the L2P table from a current L2P table position to a new L2P table position on a different one of the plurality of compressed-data memory die under control of an error manager;

setting an offset used to locate the L2P table to zero prior to copying and, responsive to completion of the copying, updating the offset to reference the new L2P table position;

and thereafter determining an address of the L2P table by adding the offset to an original L2P table address while servicing host I/O.

15. The method of claim 14, further comprising determining the address of the L2P table by addition of a current physical memory address with an offset memory address.

16. The method of claim 14, further comprising setting an initial value of the offset memory address to zero.

17. The method of claim 14, further comprising determining if the operation of copying the L2P table from the current L2P table position to the new L2P table position is complete.

18. The method of claim 17, further comprising setting the offset to a value such that the current L2P table position plus the offset are indicative of the new L2P table position in the memory when the copy operation is complete.

* * * * *